US009860777B2

(12) United States Patent
Kim et al.

(10) Patent No.: US 9,860,777 B2
(45) Date of Patent: Jan. 2, 2018

(54) CHANNEL STATUS INFORMATION FEEDBACK METHOD AND APPARATUS FOR A DISTRIBUTED ANTENNA MOBILE COMMUNICATION SYSTEM

(75) Inventors: Young Bum Kim, Seoul (KR); Youn Sun Kim, Seongnam-si (KR); Ju Hoo Lee, Suwon-si (KR); Jin Kyu Han, Seoul (KR); Joon Young Cho, Suwon-si (KR); Hyo Jin Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/314,816

(22) Filed: Dec. 8, 2011

(65) Prior Publication Data

US 2012/0147766 A1 Jun. 14, 2012

(30) Foreign Application Priority Data

Dec. 8, 2010 (KR) ........................ 10-2010-0124607

(51) Int. Cl.
*H04W 24/10* (2009.01)
*H04L 1/00* (2006.01)
*H04L 1/08* (2006.01)

(52) U.S. Cl.
CPC ........... *H04W 24/10* (2013.01); *H04L 1/0026* (2013.01); *H04L 1/08* (2013.01)

(58) Field of Classification Search
None
See application file for complete search history.

(56) References Cited

U.S. PATENT DOCUMENTS

| 2007/0201437 | A1* | 8/2007 | Kim et al. ............... 370/352 |
| 2011/0158340 | A1* | 6/2011 | Swanson .................. 375/267 |
| 2011/0176439 | A1* | 7/2011 | Mondal et al. ............ 370/252 |
| 2011/0217972 | A1* | 9/2011 | Vukajlovic Kenehan ................. H04B 17/24 455/423 |
| 2012/0092989 | A1* | 4/2012 | Baldemair et al. ........... 370/230 |
| 2012/0120903 | A1* | 5/2012 | Kim .................. H04B 7/024 370/329 |
| 2012/0147773 | A1* | 6/2012 | Kim et al. .................... 370/252 |
| 2012/0155414 | A1* | 6/2012 | Noh ................... H04B 7/0417 370/329 |

(Continued)

OTHER PUBLICATIONS

3rd Generation Partnership Project; Technical Specification Group Radio Access Network; Evolved Universal Terrestrial Radio Access (E-UTRA); Further Advancements for E-UTRA Physical Layer Aspects (Release 9), 3GPP TR 36.814 V9.0.0, Mar. 2010.

(Continued)

*Primary Examiner* — Adnan Baig
(74) *Attorney, Agent, or Firm* — The Farrell Law Firm, P.C.

(57) ABSTRACT

A method and apparatus for transmitting and receiving channel status information in a mobile communication system including a distributed antenna system. The channel status information feedback method of the present invention includes transmitting, to a base station, received signal strengths of reference signals transmitted through at least one of antennas distributed in a service area of the base station and transmitting, to a base station, channel status information corresponding to at least one antenna selected by the base station.

16 Claims, 15 Drawing Sheets

(56) References Cited

U.S. PATENT DOCUMENTS

2012/0201318 A1* 8/2012 Seo et al. .................. 375/260
2013/0089043 A1* 4/2013 Lunttila ............... H04L 1/0027
                                                                                         370/329

OTHER PUBLICATIONS

ZTE Corporation, "DL Reference Signal Design for CSI Generation in LTE-Advanced", R1-093196, 3GPP TSG-RAN WG1 Meeting #58, Aug. 28, 2009.
V. Jungnickel et al., "Coordinated Multipoint Trials in the Downlink", 2009 IEEE Globecom Workshops, Dec. 4, 2009.
Alcatel-Lucent, Comparison of CSI Feedback Schemes, R1-092149, 3GPP TSG-RAN WG1 #57, May 8, 2009.

* cited by examiner

CHANNEL STATUS INFORMATION FEEDBACK METHOD AND APPARATUS FOR A DISTRIBUTED ANTENNA MOBILE COMMUNICATION SYSTEM

PRIORITY

This application claims priority under 35 U.S.C. §119(a) to Korean Patent Application Serial No. 10-2010-0124607, which was filed in the Korean Intellectual Property Office on Dec. 8, 2010, the entire disclosure of which is hereby incorporated by reference.

BACKGROUND OF THE INVENTION

1. Field of the Invention

The present invention relates generally to a mobile communication system and, in particular, to a method and apparatus for transmitting and receiving channel status information in a distributed antenna mobile communication system.

2. Description of the Related Art

FIG. 1 is a schematic diagram illustrating a conventional cellular system including three cells each centered around an antenna, e.g., an evolved Node B (eNB) having transmit and receive antennas.

Referring to FIG. 1, three cells 100, 110, and 120 are included in the cellular system. The cell 100 is centered around the antenna 130 and serves User Equipments (UEs) 140 and 150 in its coverage area. The antenna 130 provides the UEs 140 and 150 located in the cell 100 with mobile communication services. Because the UE 140 is located farther from the antenna 130 than the UE 150, the UE 140 is served by the antenna 130 at lower data rate than the UE 150.

In FIG. 1, each of the cells 100, 110, and 120 is configured in the form of Central Antenna System (CAS), i.e., where the cell is centered around the antenna. In the CAS, although multiple antennas are allocated to each cell, all of the antennas are located at the center of the cell to serve the UEs in the service area.

In the CAS, as illustrated in FIG. 1, reference signals are transmitted for measuring downlink channel condition for each cell. For example, in a $3^{rd}$ Generation Partnership Project (3GPP) Long Term Evolution-Advanced (LTE-A) system, a UE measures a channel status between the UE and an eNB using the Channel Status Information Reference Signal (CSI-RS) transmitted by the eNB.

FIG. 2 illustrates a conventional resource block including CSI-RSs transmitted by an eNB.

Referring to FIG. 2, the x axis is the time axis, and the y axis is the frequency axis. The minimum transmission unit in time domain is an OFDM symbol, and a subframe 224 includes two slots 222 and 223, each including $N_{symbol}^{DL}$ symbols. The minimum transmission unit in the frequency domain is a subcarrier, and the system frequency band is divided into $N_{BW}$ subcarriers. $N_{BW}$ is equal to the system transmission band. The basic unit of time-frequency resource is a Resource Element (RE), which is defined by an Orthogonal Frequency Division Multiplexing (OFDM) index symbol index and a subcarrier index. Resource Blocks (RBs) 220 and 221 are defined as $N_{symbol}^{DL}$ contiguous OFDM symbols in the time domain and $N_{SC}^{RB}$ contiguous subcarriers in the frequency domain. That is, an RB includes $N_{symbol}^{DL} \times N_{SC}^{RB}$ REs. The minimum transmission unit of normal data or control information is RB.

A downlink control channel is transmitted in the first three OFDM symbols at the beginning of the subframe 224. A Physical Downlink Share Channel (PDSCH) is transmitted on resources remaining after the allocation for the downlink control channel in the subframe 224. A Demodulation Reference Signal (DM-RS) is the reference signal that is referenced by a UE to demodulate the PDSCH.

The subframe 224 carries CSI-RSs 200, 201, 202, 203, 204, 205, 206, 207, 208, 209, 210, 211, 212, 213, 214, 215, 216, 217, 218, and 219 for CSI-RS antenna ports. Here, the CSI-RSs 200, 201, 202, 203, 204, 205, 206, 207, 208, 209, 210, 211, 212, 213, 214, 215, 216, 217, 218, and 219 are transmitted by a UE with two CSI-RS antenna ports, such that the UE can perform downlink measurement at a location. The CSI-RSs 200, 201, 202, 203, 204, 205, 206, 207, 208, 209, 210, 211, 212, 213, 214, 215, 216, 217, 218, and 219 are defined per logically defined CSI-RS antenna port for channel status measurements of respective CSI-RS antenna ports.

When the same CSI-RSs 200, 201, 202, 203, 204, 205, 206, 207, 208, 209, 210, 211, 212, 213, 214, 215, 216, 217, 218, and 219 are transmitted through multiple physical antennas, the UE cannot discriminate between the physical antennas but merely recognizes a single antenna port.

In mobile communication systems including a plurality of cells, it is possible to transmit CSI-RSs 200, 201, 202, 203, 204, 205, 206, 207, 208, 209, 210, 211, 212, 213, 214, 215, 216, 217, 218, and 219 with cell-specific location information. That is, cells are assigned the time-frequency resources different in position for the CSI-RS to avoid interference between CSI-RSs of different cells.

However, in a CAS, because the antennas of each eNB are concentrated at the center of the cell, it is difficult to provide a UE located far from the center of the cell with services at a high data rate.

SUMMARY OF THE INVENTION

The present invention has been made in an effort to solve at least the above-described problems occurring in the related art, and to provide at least the following advantages.

Accordingly, an aspect of the present invention is to provide a method for configuring a Distributed Antenna System (DAS) that is supportable in LTE-A.

Another aspect of the present invention is to provide a method for efficiently transmitting and receiving the channel status information on distributed and centered antennas.

In accordance with an aspect of the present invention, a method for a terminal to transmit channel status information in a mobile communication system is provided. The method includes transmitting, to a base station, received signal strengths of reference signals transmitted through at least one of antennas distributed in a service area of the base station; and transmitting, to a base station, channel status information corresponding to at least one antenna selected by the base station.

In accordance with another aspect of the present invention, a method for a base station to receive channel status information in a mobile communication system is provided. The method includes requesting a terminal located in a service area of the base station to report channel status information on antennas distributed throughout the service area; receiving the channel status information from the terminal; selecting one of the antennas for use in communication with the terminal, based on the channel status information; and communicating with the terminal through the selected antenna.

In accordance with another aspect of the present invention, an apparatus for transmitting channel status information in a mobile communication system is provided. The apparatus includes an Radio Frequency (RF) processor that establishes a radio link with a base station; a received signal strength processor that controls measuring received signal strengths of reference signals transmitted through at least one of multiple antennas distributed in a service area of the base station and transmits the measured received signal strength to the base station; and a channel status information processor that controls measuring the channel status information of at least one of the antennas and transmits the measured channel status information to the base station.

In accordance with another aspect of the present invention, an apparatus for receiving channel status information in a mobile communication system is provided. The apparatus includes a channel status information controller that requests a terminal located in a service area of the apparatus to report channel status information on antennas distributed in the service area, receives the channel status information from the terminal, selects one of the antennas for use in communication with the terminal, and communicates with the terminal through the selected antenna; and a radio frequency processor that establishes a radio link for communication with the terminal via the selected antenna under the control of the channel status information controller.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

Various embodiments of the present invention are described in detail below with reference to the accompanying drawings. Detailed descriptions of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although embodiments of the present invention will be described herein with reference to LTE-A (or Advanced Evolved Universal Terrestrial Radio Access (EUTRA)) by way of example, it will be understood by those skilled in the art that the embodiments of the present invention can be applied to other communication systems having similar technical backgrounds and channel formats, with slight modifications, without departing from the spirit and scope of the present invention.

In accordance with an embodiment of the present invention, a method and apparatus are provided for efficiently transmitting and receiving CAS channel status information and DAS channel status information.

Figure 1:
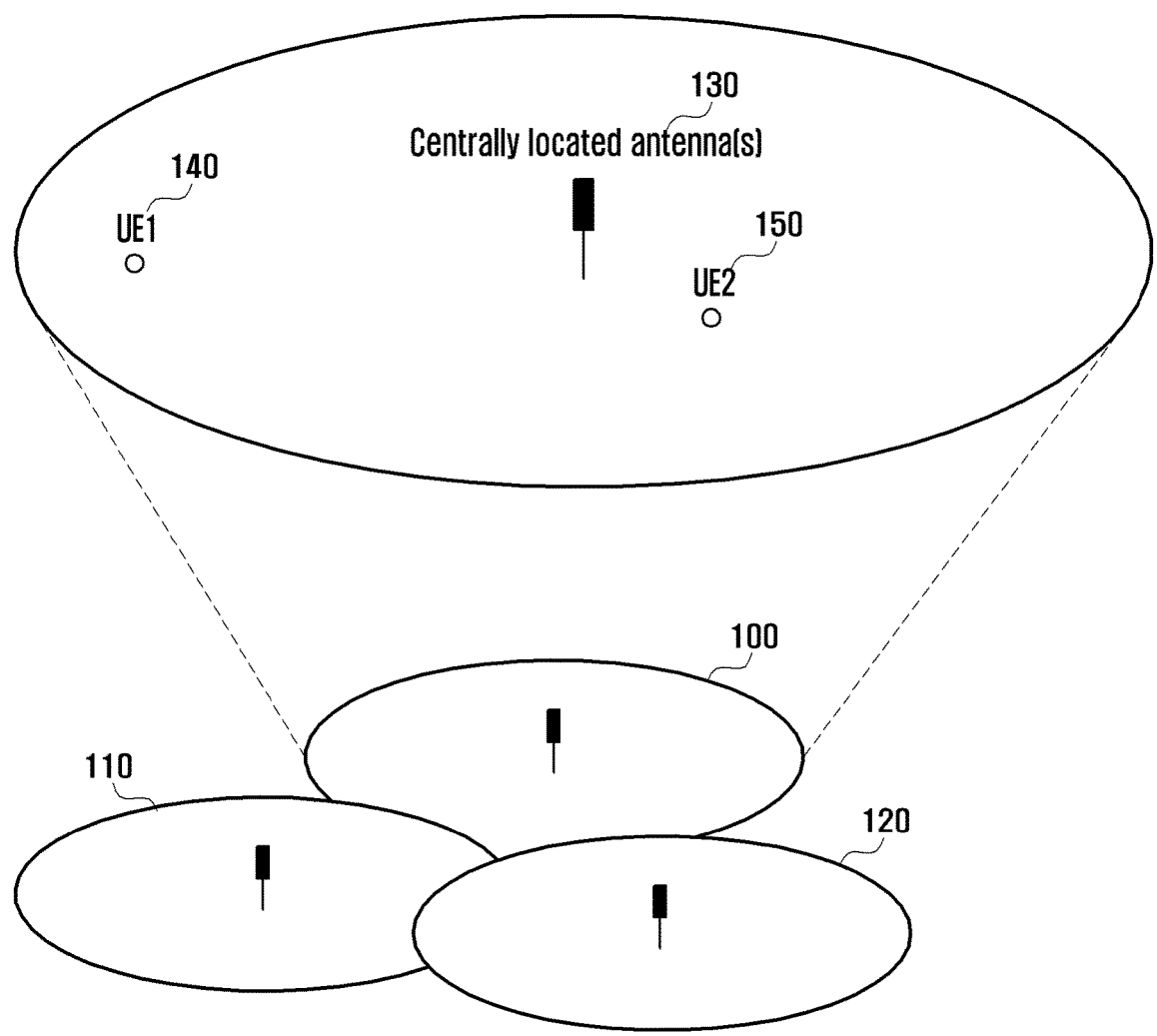
FIG. 1 illustrates a conventional cellular system including three cells, each centered around an antenna.
Figure 2:
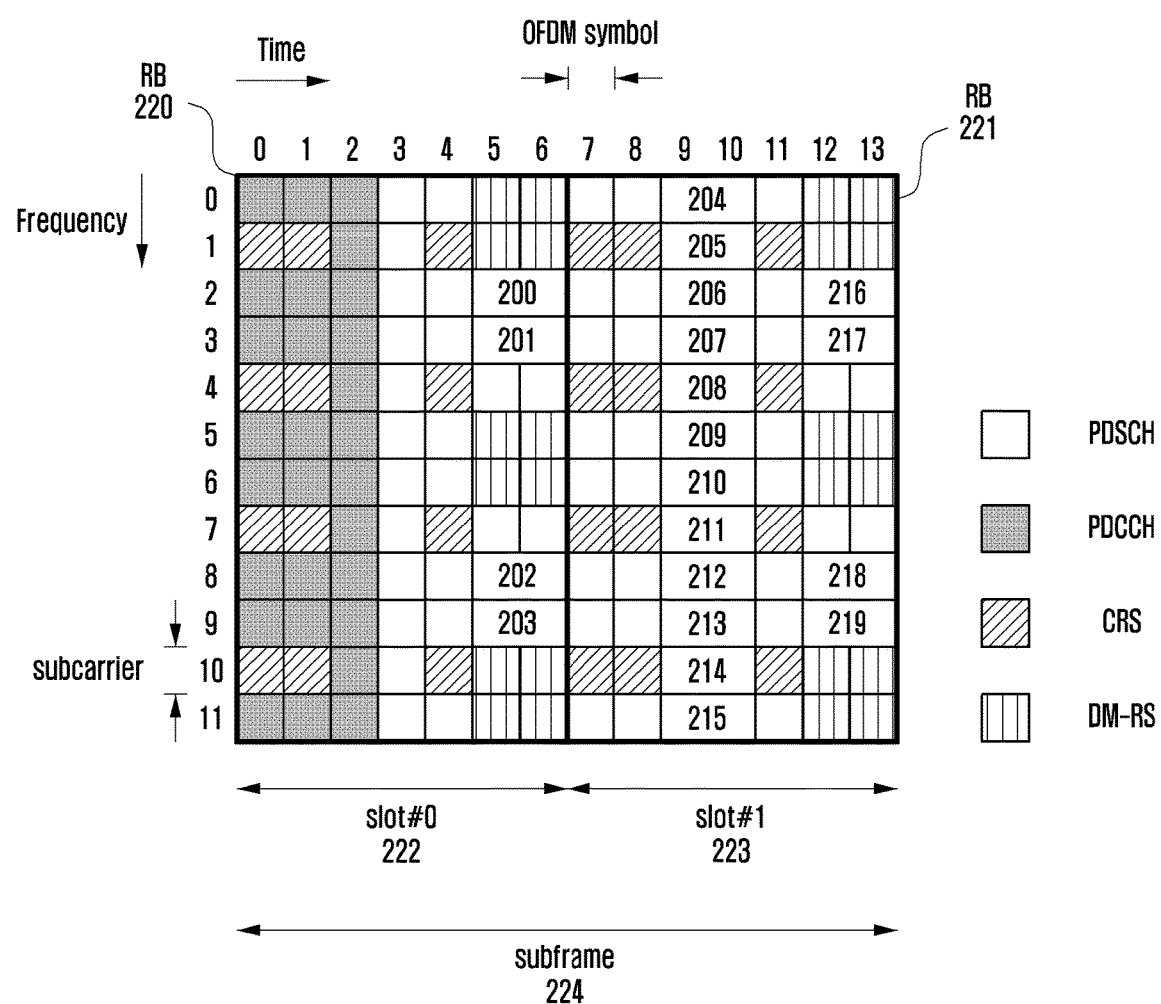
FIG. 2 illustrates a conventional resource block including CSI-RSs transmitted by an eNB.
Figure 3:
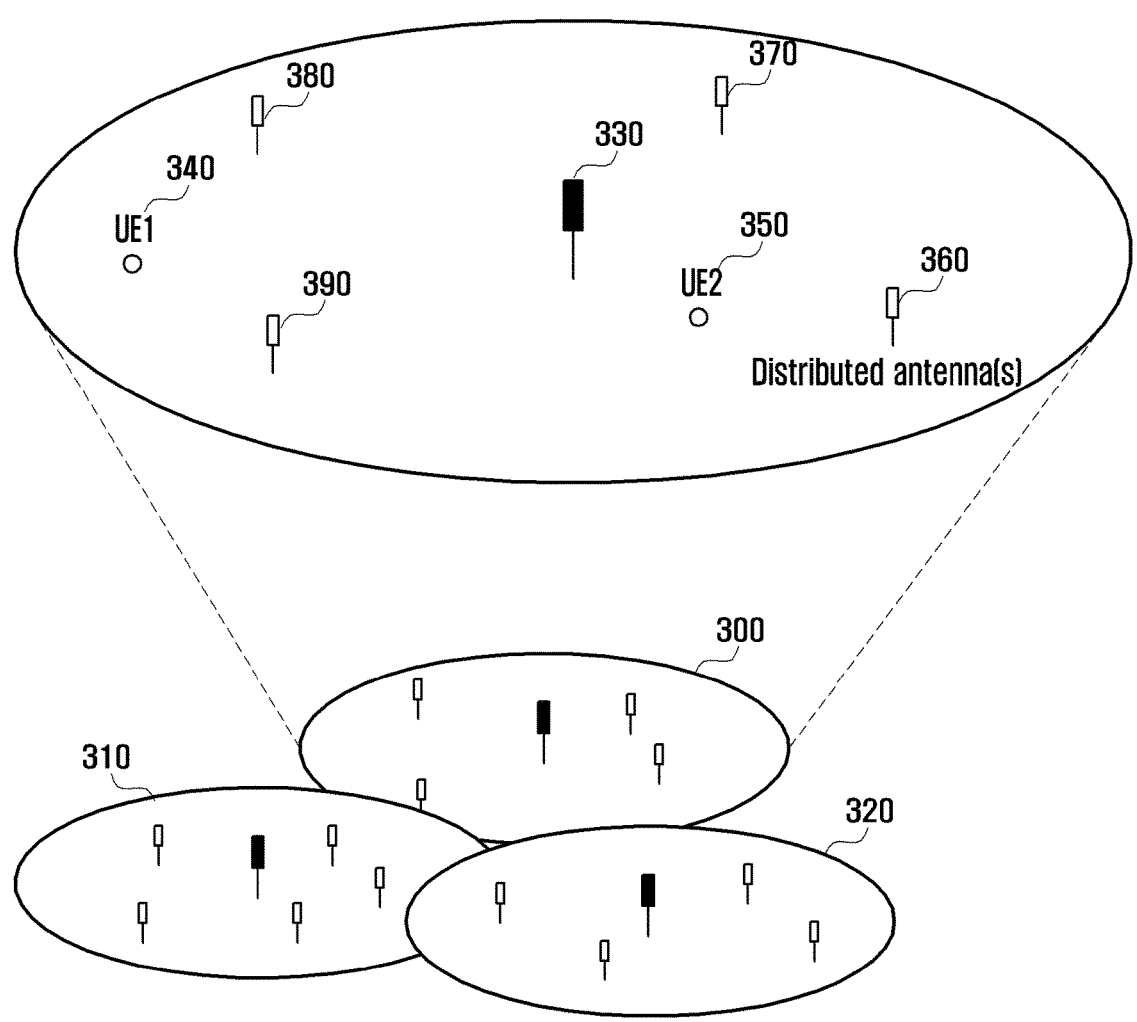
FIG. 3 illustrates a mobile communication system configured with both a CAS and a DAS, according to an embodiment of the present invention.

FIG. 3 illustrates a mobile communication system configured with both a CAS and a DAS, according to an embodiment of the present invention.

Referring to FIG. 3, the mobile communication system includes a plurality of cells 300, 310, and 320. Each of cells includes a centered antenna 330 and a plurality of distributed antennas 360, 370, 380, and 390, e.g., an eNB at the center of each cell in which a plurality of antennas of the eNB are distributed.

Specifically, each cell includes a central antenna 330 arranged at the cell's center, a plurality of distributed antennas 360, 370, 380, and 390 deployed outward from the cells' center in the cell, and a first and second UEs 340 and 350. Here, the central antenna 330 and the distributed antennas 360, 370, 380, and 390 are connected to each other and controlled by a central controller of the eNB.

The central antenna 330 provides mobile communication service to the first and second UEs 340 and 350. However, because the first UE 340 is located farther from the central antenna 330 than the second UE 350, the first UE 340 is served by the central antenna 330 at a relatively slower data rate. Typically, as the propagation path of the signal elongates, the received signal quality degrades. Therefore, by deploying the plurality of distributed antennas 360, 370, 380, and 390 within the cell 300 and providing the first and second UEs 340 and 350 with the mobile communication service through a distributed antenna optimally selected according to the locations of the first and second UEs 340 and 350, it is possible to improve the data rate.

For example, the first UE 340 communicates through the distributed antenna 390 providing the best channel environment while the second UE 350 communicates through the distributed antenna 360 providing the best channel environment, thereby communicating with the eNB at a high data rate.

Generally, the central antenna 330 is responsible for supporting normal mobile communication service, with the exception of the high speed data service, and mobility of the first and second UEs 340 and 350 crossing the boundaries of the cells 300, 310, and 320. Each of the central antenna 330 and distributed antennas 360, 370, 380, and 390 can included a plurality of antenna ports.

Figure 4:
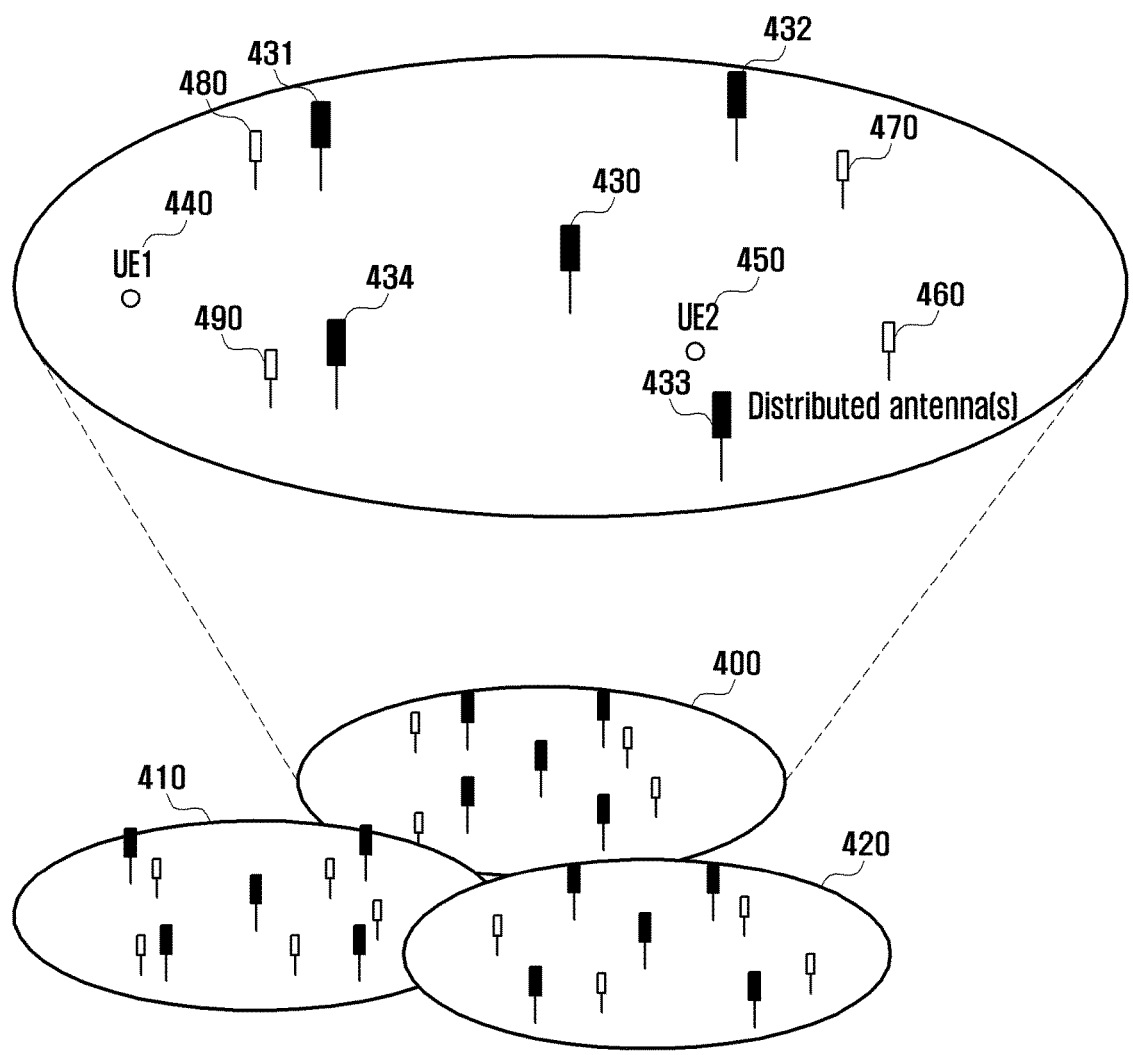
FIG. 4 illustrates a mobile communication system configured with both a CAS and a DAS, according to another embodiment of the present invention.

FIG. 4 illustrates a mobile communication system configured with both a CAS and a DAS, according to another embodiment of the present invention. Unlike the mobile communication system illustrated in FIG. 3, in which the central antenna is arranged at the center of the cell, in the mobile communication system illustrated in FIG. 4, a plurality of central antennas are distributed throughout the cell.

Referring to FIG. 4, the mobile communication system includes a plurality of cells 400, 410, and 420. Each of the cells 400, 410, and 420 includes a plurality of central antennas 430, 431, 432, 433, and 434 distributed throughout the cells, a plurality of distributed antennas 460, 470, 480, and 490 distributed throughout the cell, and a first and second UEs 440 and 450. Generally, The central antennas 430, 431, 432, 433, and 434 provide the first and second UEs 440 and 450 with normal mobile communication services, except for a high speed data service, and support mobility of the first and second UEs 440 and 450 roaming across the cells 400, 410, and 420. The distributed antennas 460, 470, 480, and 490 provide high speed mobile communication services.

Herein, the logical concepts of a Central antenna port (C-port) and a Distributed antenna port (D-port) are defined such that the central and distributed antennas can be discriminated logically from each other, regardless of their physical configurations.

The C-port defines CSI-RS for supporting CAS for each antenna port, such that a UE can measure a channel status for each antenna port of the C-port. The CSI-RS transmitted through the C-port covers the entire area of a cell.

The D-port defines CSI-RS for supporting DAS for each antenna port, such that the UE can measure a channel status for each antenna port of the D-port. The CSI-RS transmitted through the D-port covers a local area within the cell. As described above, if the same CSI-RS is transmitted through the multiple physical antennas, a UE cannot discriminate among the physical antennas located at different positions, and merely identifies CSI-RS coming for the same antenna port.

Referring again to FIG. 3, when the first and second antennas 380 and 390 transmit CSI-RS #1 and CSI-RS #2 having different patterns respectively, the first UE 340 measures the channel state between the first distributed antenna 380 and the first UE 340 based on the CSI-RS #1, and measures the channel state between the second distributed antenna 390 and the first UE 340 based on the CSI-RS #2. In this case, the first distributed antenna 380 is referred to as D-port #1, and the second distributed antenna 390 is referred to as D-port #2.

However, when the first and second distributed antennas 380 and 390 transmit the CSI-RS #3 having the same pattern, the first UE 340 cannot discriminate between the first and second distributed antennas 380 and 390 using the CSI-RS #3 and measures the channel states between the first UE and the first distributed antenna 380 and between the first UE and the second distributed antenna 390. In this case, the combination of the first and second antennas 380 and 390 is referred to as a D-port #3.

Time-frequency resources are allocated for transmitting a C-port CSI-RS and a D-port CSI-RS so as not to be overlapped with each other, avoiding interference.

The control information carrying the CSI-RS, which the UE feeds back to the eNB, can be categorized into Reference Signal Received Power (RSRP) and Channel Status Information (CSI). The UE calculates RSRP by measuring a CSI-RS for relatively long time. That is, an RSRP is a long term measurement value between the UE and the antenna port of the eNB and includes information such as path loss, which changes slowly over time. Although RSRP is reported from the UE to the eNB through higher layer signaling, which is not time-varying sensitive and has less signaling overhead-constraint, both the higher layer signaling and physical layer signaling can be used.

In DAS, an eNB determines a candidate D-port set for use in communication with a UE based on an RSRP. Here, the UE can calculate the RSRP of each of C-port and D-port.

A UE calculates CSI by measuring a CSI-RS for a relatively short time duration. That is, CSI is a short term measurement value between the UE and the antenna port of the eNB and includes an instant channel state, which changes quickly over time. Although CSI is reported from the UE to the eNB through physical layer signaling, which is time-varying sensitive and has less signaling overhead-constraint, both the higher layer signaling and physical layer signaling can be used.

An eNB uses CSI for selecting a certain D-port from a candidate D-port set determined using RSRP. CSI includes at least one of a Channel Quality Indicator (CQI), a Precoding Matrix Indicator (PMI), and a Rank Indicator (RI). A CQI indicates Signal to Interference and Noise Ratio (SINR) on a system band (wideband) or sub-band. CQI can be expressed as a Modulation and Coding Scheme (MCS) satisfying a predetermined data reception performance. A PMI provides precoding information for an eNB to transmit data through multiple antennas in a system supporting Multiple Input Multiple Output (MIMO). An RI provides rank information for an eNB to transmit data through multiple antennas in a system supporting MIMO.

CSI is defined for each of a C-port and a D-port. When transmitting CSI to an eNB, a UE receives, from the eNB, CSI configuration information including a reporting mode indicating information to be fed back, information on a resource to be used, and a transmission period. The eNB selects a certain D-port from a candidate D-port set based on the CSI acquired from the UE and sets the MCS for data transmission to appropriate value so as to fulfill a predetermined reception performance. Herein, uplink refers to the radio link transmitting data or control signal from the UE to the eNB, and downlink refers to the radio link transmitting data or control signal from the eNB to the UE.

Figure 5:
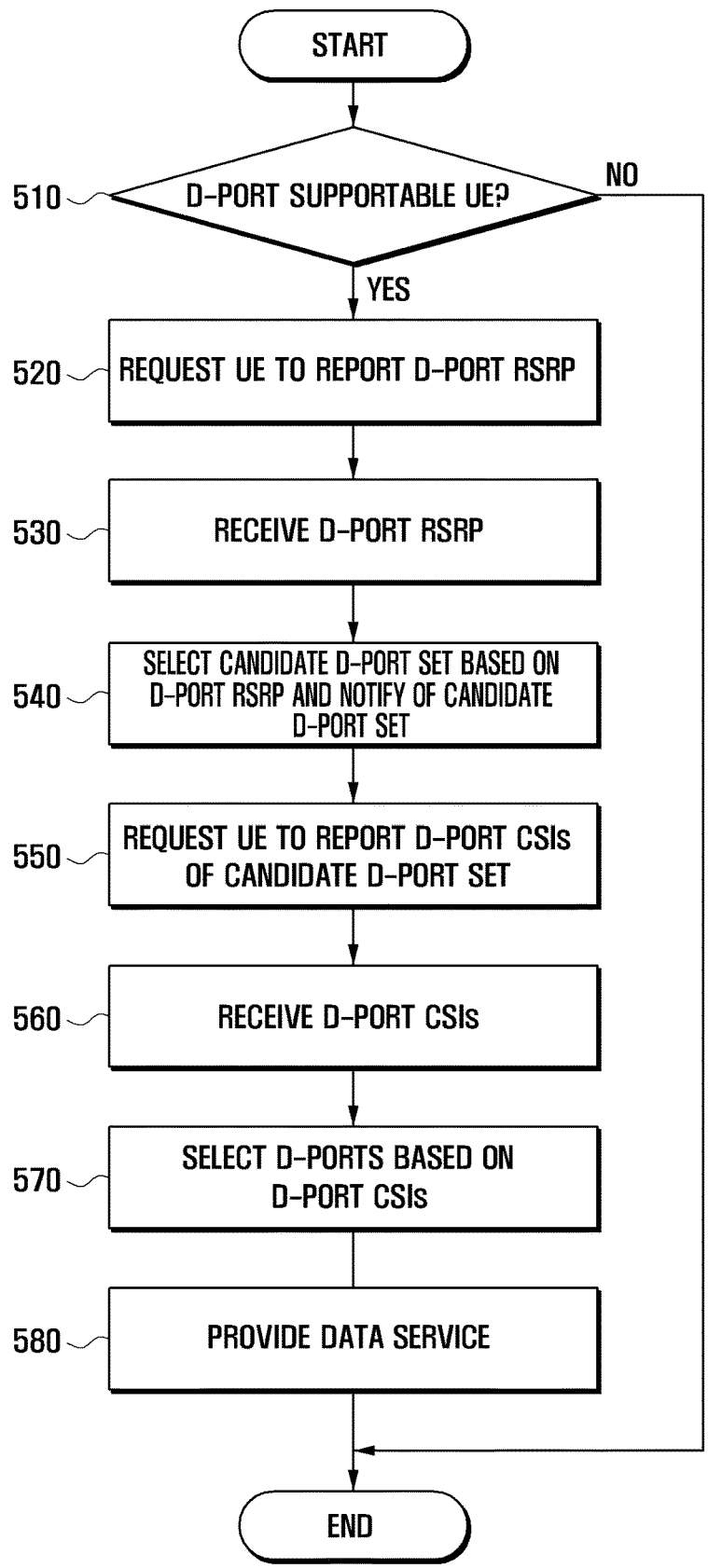
FIG. 5 is a flowchart illustrating an eNB procedure for selecting a D-port to provide a UE with high speed data service, according to an embodiment of the present invention.

FIG. 5 is a flowchart illustrating an eNB procedure for selecting a D-port to provide a UE with a high speed data service, according to an embodiment of the present invention.

Referring to FIG. 5, the eNB determines whether the UE supports a D-port in step 510. That is, after the UE connects to the eNB, the eNB determines whether the UE can communicate with the eNB through a D-port. If the UE does not support D-port, the eNB terminates the procedure for selecting a D-port.

If the UE supports a D-port in step 510, the eNB requests the UE to report an RSRP for the D-port in step 520. When multiple D-ports are configured in the corresponding cell, the eNB notifies the UE of at least one the D-ports for which an RSRP is to be reported through higher layer signaling or physical layer signaling.

In step 530, the eNB receives the RSRP transmitted from the UE. In step 540, the eNB generates a candidate D-port set including at least one D-port available for communication with the UE and notifies the UE of the candidate D-port set. For example, the eNB generates the candidate D-port set including the D-ports of which the RSRP is greater than a predetermined value.

In step 550, the eNB requests the UE to report D-port CSIs of the candidate D-port set. The eNB can transmit, to the UE, the configuration information related to the CSI transmission. The configuration information includes a CSI transmission resource, a CSI transmission period for transmitting individual C-ports and D-ports, CSI transmission offsets for individual C-ports and D-ports, CSI transmission timings of individual C-ports and D-ports in the CSI transmission periods, relative priorities of individual C-ports and D-ports, information on whether to use Best-M (Best-M will be described in more detail below), and an M value.

In step 560, the eNB receives the D-port CSIs from the UE, and in step 570, the UE selects a D-port in the candidate D-port set based on the D-port CSIs. For example, the eNB selects the candidate D-port having CSI that is greater than a threshold value from among the candidate D-ports of the candidate D-port set. In step 580, the eNB provides the UE with the high speed data service through the selected D-port.

Figure 6:
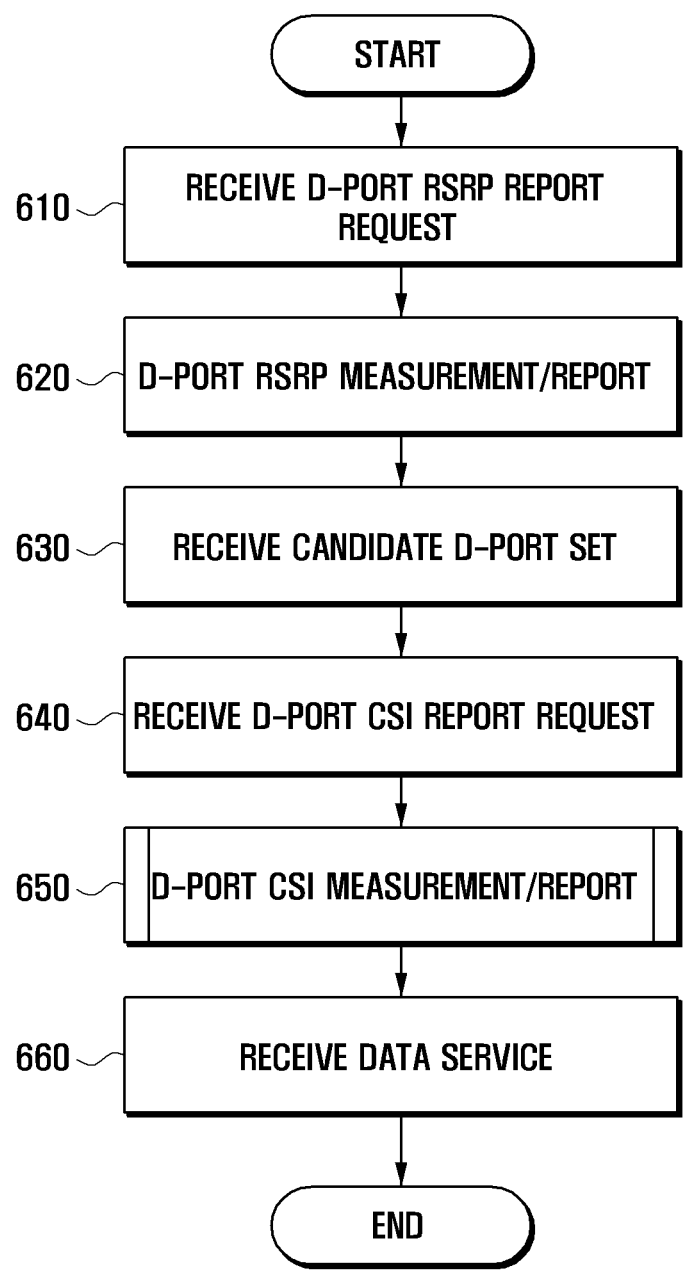
FIG. 6 is a flowchart illustrating a procedure for a UE supporting a D-port to receive a high speed data service, according to an embodiment of the present invention.

FIG. 6 is a flowchart illustrating a procedure for a UE supporting a D-port to receive a high speed data service, according to an embodiment of the present invention.

Referring to FIG. 6, the UE receives a D-port RSRP report request from the eNB in step 610. For example, the eNB can notify the UE of all of the D-ports or multiple D-ports selected from all of the D-ports in the cell for which the RSRP is requested. In step 620, the UE measures and reports the D-port RSRP to the eNB through higher layer signaling or physical layer signaling.

In step 630, the UE receives the information on the candidate D-port set from the eNB. The UE checks the candidate D-port set for D-port CSI measurement.

In step 640, the UE receives a D-port CSI report request transmitted by the eNB and indicating the D-ports selected from the candidate D-port set. The UE can acquire the configuration information related to the CSI transmission from the eNB. As described above, the configuration information includes a CSI transmission resource, CSI transmission periods of individual C-ports and D-ports, CSI transmission offsets for individual C-ports and D-ports, CSI transmission timings of individual C-ports and D-ports in the CSI transmission periods, relative priorities of individual C-ports and D-ports, information on whether to use Best-M, and an M value.

In step 650, the UE measures and reports D-port CSIs to the eNB.

In step 660, the UE receives the data service provided by the eNB, i.e., the eNB provides the UE with the high speed data service via the D-port selected by the eNB.

The eNB procedure illustrated in FIG. 5 and UE procedure illustrated in FIG. 6 can be modified in various manners.

For example, although the description of FIG. 5 is directed to the eNB requesting the UE to report D-port RSRP via explicit signaling, the present invention is not limited thereto. That is, the UE can be configured to report D-port RSRP when the conditions agreed between the UE and the eNB are satisfied.

For example, conditions for the UE to report the D-port RSRP to the eNB can include at least one of:

(1) when a report timing arrives according to a predetermined D-port RSRP report period;

(2) when the absolute value of the D-port RSRP measured by the UE is greater than a predetermined threshold value; and (3) when a displacement of the D-port RSRP measured by the UE is greater than a predetermined threshold value.

Additionally, although the eNB notifies the UE of the candidate D-port set in step 540, the present invention is not limited thereto. For example, the procedure can progress to step 550 without the notification step 540.

Further, although the eNB transmits the configuration information related to the CSI transmission to the UE in step 550 of FIG. 5, and the UE receives the configuration information related to the CSI transmission in step 640 of FIG. 6, the present invention is not limited thereto. That is, the eNB can transmit the CSI transmission configuration information to the UE before step 520, and the UE can receive the CSI transmission configuration information transmitted by the eNB before step 610.

In the mobile communication system supporting both a CAS and a DAS, the method for the UE to report the CSI can be implemented in various ways. For example, a UE may feeds back the C-port and D-port CSIs multiplexed in the time domain to the eNB.

Figure 7:
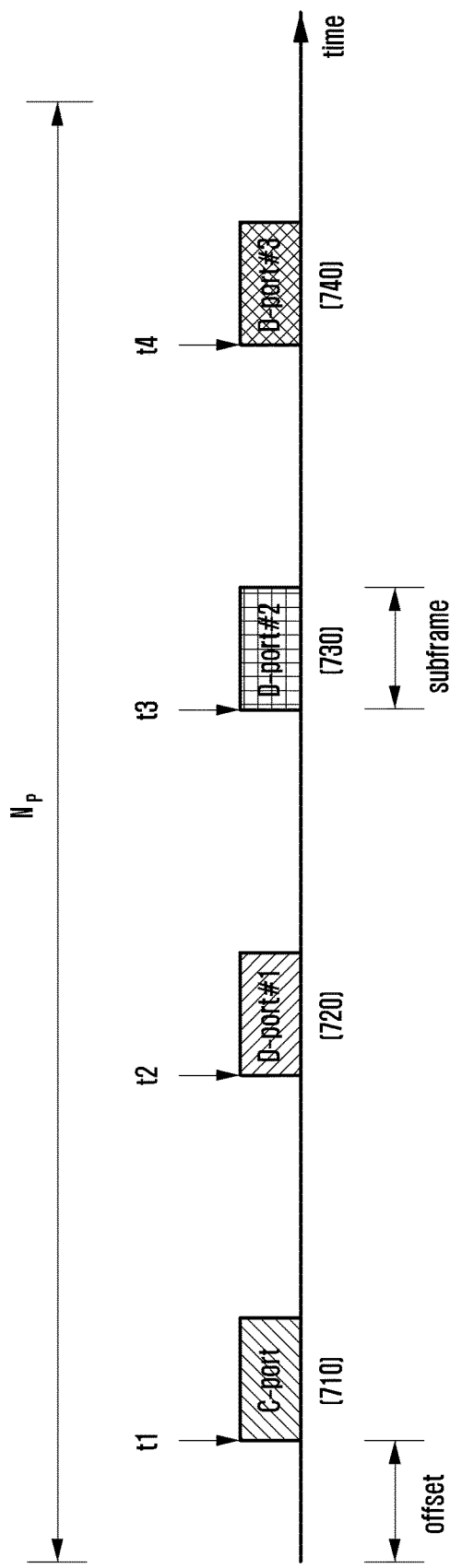
FIG. 7 illustrates a principle of a time division-multiplexed C-port and D-port CSI report method according to an embodiment of the present invention.

FIG. 7 illustrates a principle of a time division-multiplexed C-port and D-port CSI report method, according to an embodiment of the present invention.

Referring to FIG. 7, the UE acquires the CSI configuration information from the eNB in advance. The CSI configuration information includes at least one of a CSI transmission period (Np), a CSI transmission offset, CSI transmission timings (t1, t2, t3, t4, . . . ) of C-ports and D-ports, a reporting mode, and resource information. The CSI transmission period denotes the iterative intervals of the C-port and D-port CSIs in the same pattern. The CSI transmission offset indicates the number of subframes between the start point of Np and the initially transmitted CSI in the CSI transmission period. The CSI transmission timings of C-port and D-port can be distributed at a regular or irregular intervals in the CSI transmission period. The reporting mode indicates the feedback information that is to be transmitted from among the CQI, the PMI, and the RI. The resource information indicates the resource to be used for CSI transmission.

In FIG. 7, the eNB notifies the UE of the CSI configuration information with the candidate D-port set={D-port #1, D-port #2, D-port #3}. In the configured CSI transmission period, the C-port CSI 710 is transmitted at t1, D-port #1 CSI 720 at t2, D-port #2 CSI 730 at t3, and D-port #3 740 at t4. The CSI transmission timings t1, t2, t3, and t4 are signaled separately or calculated by the UE based on the configured CSI transmission period and the number of CSIs transmitted in regular pattern in the CSI transmission period, without separate signaling. Although the CSI transmission timings for the C-port and D-port can be maintained in the CSI transmission period, the detailed information on the C-port and D-port CSI transmissions can be changed for each CSI transmission period. For example, the UE can transmit PMI in the current transmission period while transmitting CQI in the previous transmission period.

Figure 8:
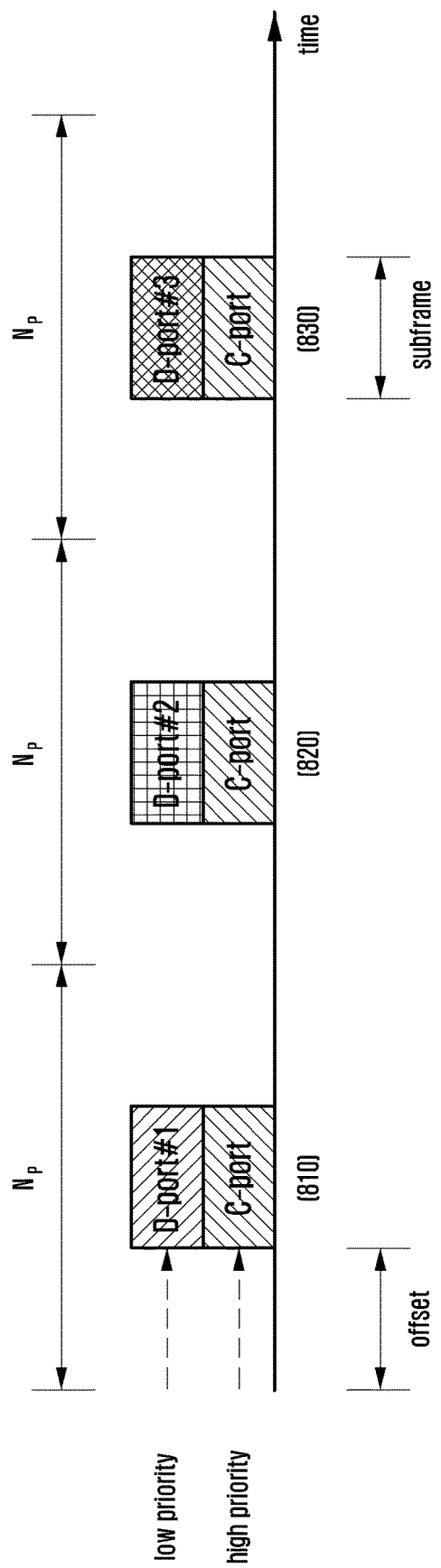
FIG. 8 illustrates a principle of a time division-multiplexed CSI report method according to another embodiment of the present invention.

The time division multiplexing can be modified in various manners, and FIG. 8 illustrates a principle of a time division-multiplexed CSI report method according to another embodiment of the present invention.

Referring to FIG. 8, the eNB assigns a higher priority to a C-port or D-port CSI so as to be fed back frequently as compared to others assigned a lower priority. That is, the CSI assigned the high priority is transmitted at a frequency 'a' while the other CSI assigned the low priority is transmitted at a frequency 'b', where a>b.

In FIG. 8, the C-port CSI is assigned a higher priority, and the candidate D-port set is {D-port #1, D-port #2, D-port #3}. In this case, the C-port CSI is transmitted in every CSI transmission period while one of the D-port CSIs is transmitted in each CSI transmission period, in an order of D-port #1 CSI→D-port #2 CSI→D-port #3 CSI.

Another method for the UE to report the C-port and D-port CSIs can be defined as a Best-M method. In the Best-M method, the UE transmits M CSIs having good CSI values that are selected from K CSIs to be fed back. Here, M<K.

Figure 9:
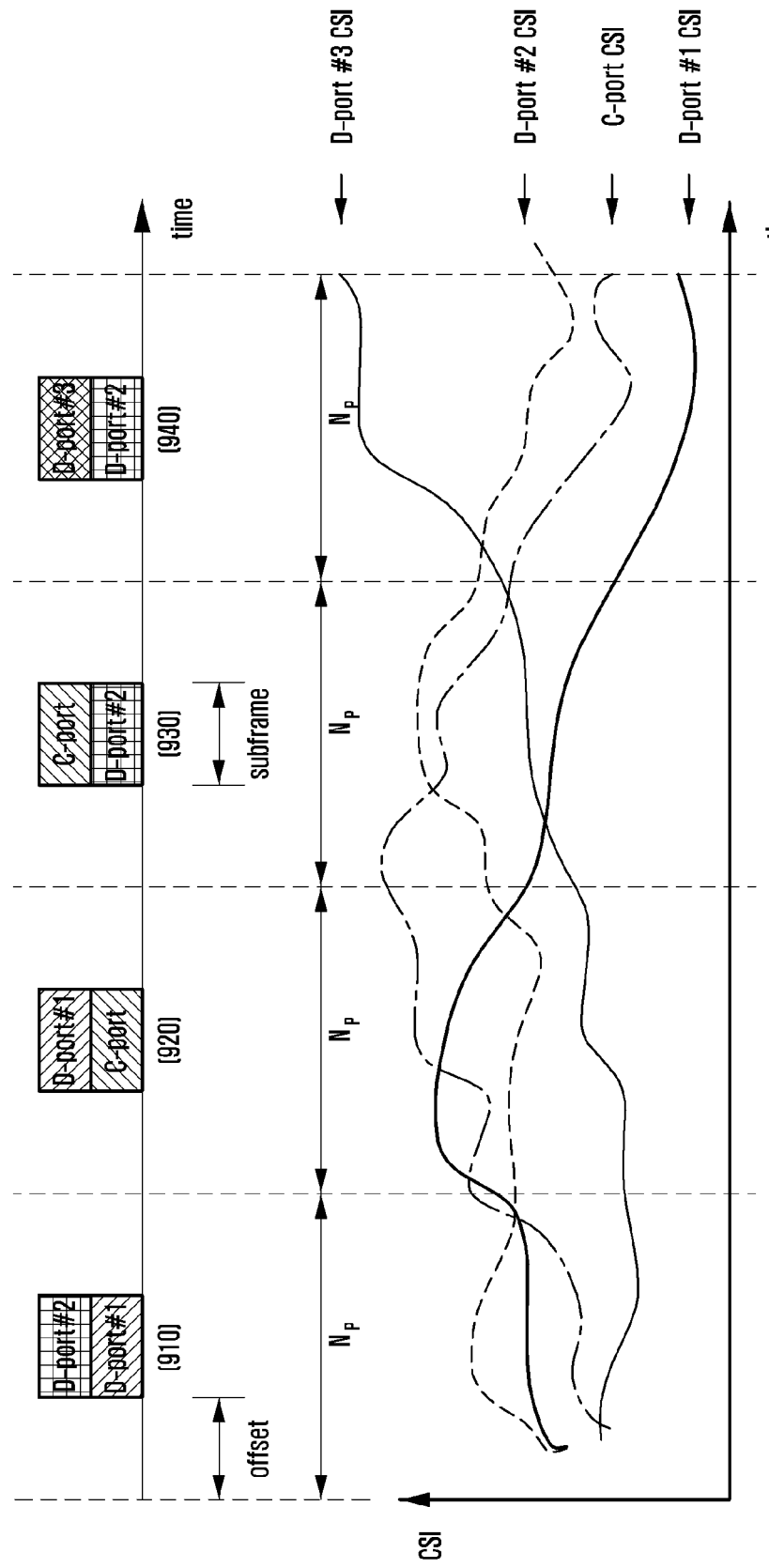
FIG. 9 illustrates CSI feedback of a UE based on a Best-M scheme, according to an embodiment of the present invention.

FIG. 9 illustrates CSI feedback of a UE based on a Best-M scheme, according to an embodiment of the present invention.

Referring to FIG. 9, the eNB notifies the UE of the candidate D-port set of {D-port #1, D-port #2, D-port #3} and saves the CSI configuration information and M signaled by the eNB in advance. In FIG. 9, M=2 and the UE selects and transmits two superior CSIs at each CSI transmission period. That is, the UE transmits D-port #1 CSI and D-port #2 CSI at the transmission timing 910, D-port #1 CSI and C-port CSI at the second transmission timing 920, C-port CSI and D-port #2 CSI at the third transmission timing 930, and D-port #2 CSI and D-port #3 CSI at the fourth transmission timing 940. In this case, the UE feeds back the CSI value with a port index. The port index is an identity number assigned each of the C-ports and the D-ports that are agreed between the eNB and the UE.

The Best-M method can be modified.

Figure 10:
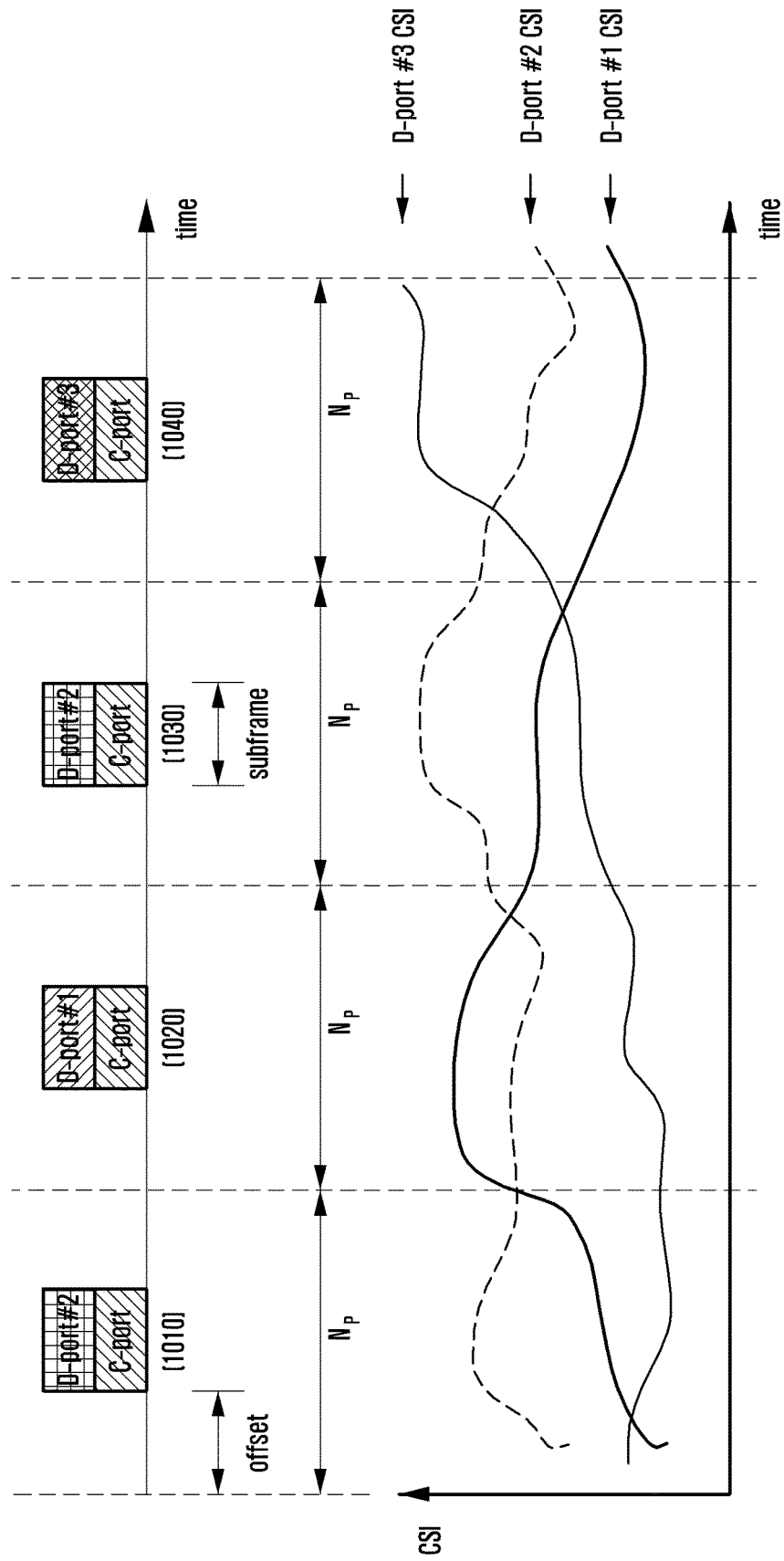
FIG. 10 illustrates a principle of a Best-M method, according to an embodiment of the present invention.

FIG. 10 illustrates a principle of a Best-M method, according to an embodiment of the present invention.

Referring to FIG. 10, the eNB assigns a higher priority to a C-port or a D-port, such that the corresponding CSI is transmitted more frequently than other CSIs assigned relatively lower priority. In FIG. 10, the C-port CSI is assigned the higher priority, and the candidate D-port set is {D-port #1, D-port #2, D-port #3} is assigned the lower priority. Accordingly, the C-port CSI is transmitted at each CSI transmission period with a D-port CSI having the best value that is selected in the candidate D-port set (M=1). That is, the UE transmits the C-port CSI and the D-port #2 CSI at the first transmission timing 1010, the C-port CSI and the D-port #1 CSI at the second transmission timing 1020, the C-port CSI and the D-port #2 CSI at the third transmission timing, and the C-port CSI and the D-port #3 CSI at the fourth transmission timing. Again, the UE feeds back the CSI value along with a port index, i.e., an identity number assigned each of the C-ports and D-ports that are agreed between the eNB and the UE.

In FIGS. 9 and 10, the UE transmits the CSIs at a predetermined CSI transmission period in the Best-M method. In another approach, the CSIs can be transmitted in the Best-M method whenever a predetermined condition is fulfilled, without separate configuration of transmission period. For example, the UE can feed back M CSI to the UE when M CSIs have a value greater than a predetermined threshold value.

Figure 11:
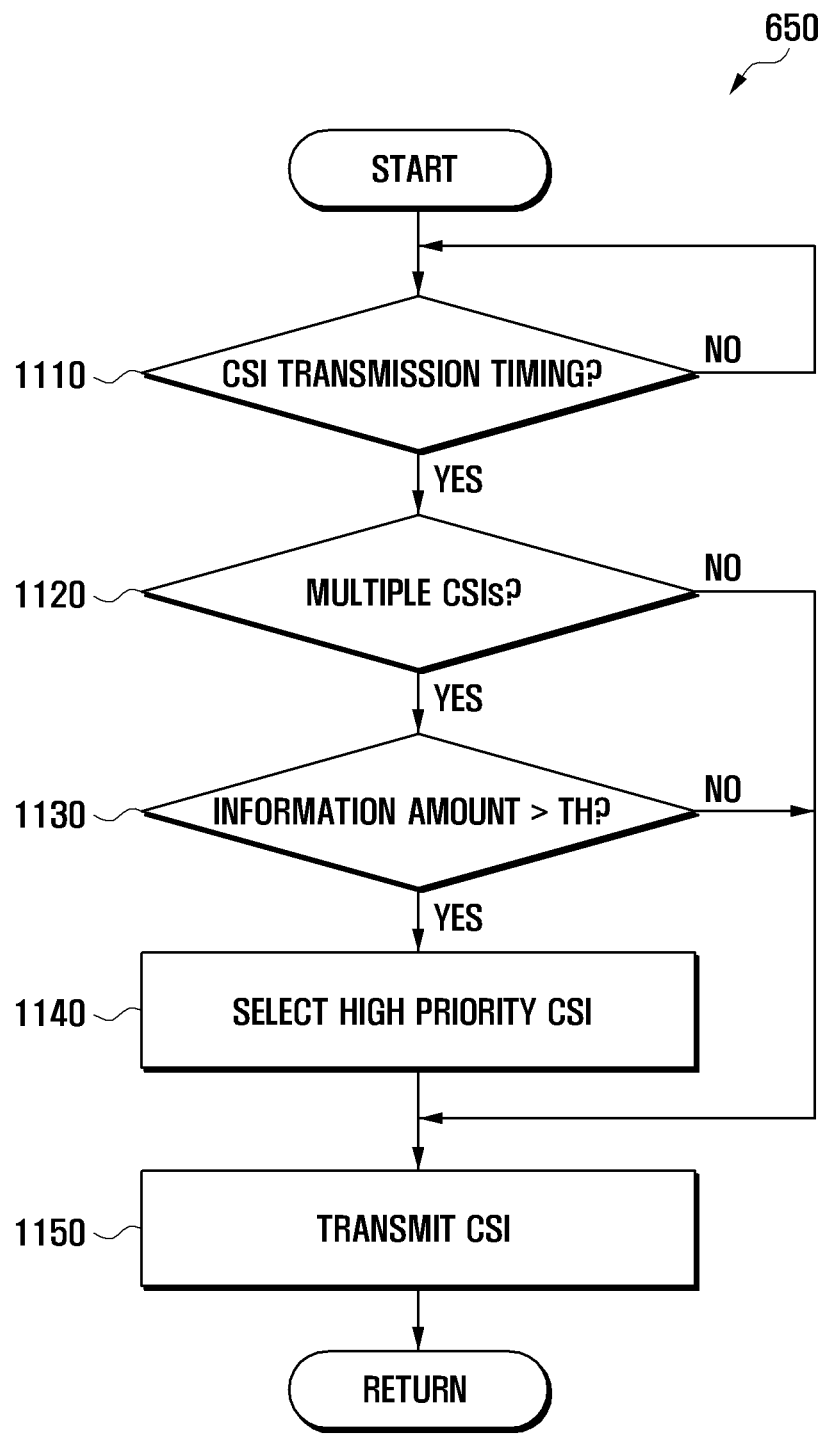
FIG. 11 is a flowchart illustrating a UE procedure for CSI feedback according to an embodiment of the present invention.

FIG. 11 is a flowchart illustrating a UE procedure for CSI feedback, according to an embodiment of the present invention.

Referring to FIG. 11, when CSI transmission timing arrives in step 1110, the UE determines whether the transmission timings of multiple CSIs overlap each other in step 1120. Here, the CSI transmission timing can be checked based on the CSI configuration information transmitted by the eNB.

If multiple CSI transmission timings do not overlap each other, the UE transmits the corresponding CSI in step 1150.

However, if multiple CSI transmission timings overlap each other in step 1120, the UE determines whether a sum of a CSI information amount at a current time is greater than a predetermined threshold value (TH) in step 1130. If the sum of the CSI information amount is not greater than the threshold value (TH), the UE transmits all of the multiple CSIs simultaneously in step 1150.

However, if the sum of the CSI information amount is greater than the threshold value (TH), the UE selects at least one CSI to be transmitted from among the multiple CSI in step 1140, and then transmits the selected CSIs to the eNB in step 1150. The UE selects the C-port or D-port CSI having the highest priority by referencing the CSI configuration information as far as not exceeding the threshold value (TH). In the simplest example, because the C-port covers the entire area of the cell, the C-port CSI is assigned a higher priority than a D-port CSI. When using the Best-M method, the CSIs having superior values are selected as far as their sum does not exceed the threshold value (TH).

Although the CSIs are transmitted periodically in FIG. 11, the CSI transmission can be modified diversely. For example, the UE can be configured to transmit CSIs whenever a predetermined condition is fulfilled, without configuration of a CSI transmission period. That is, the UE can be configured such that, when the CSI measured at a certain time is greater than the threshold value, the corresponding CSIs are transmitted. In this case, step 1110 can be omitted.

Figure 12:
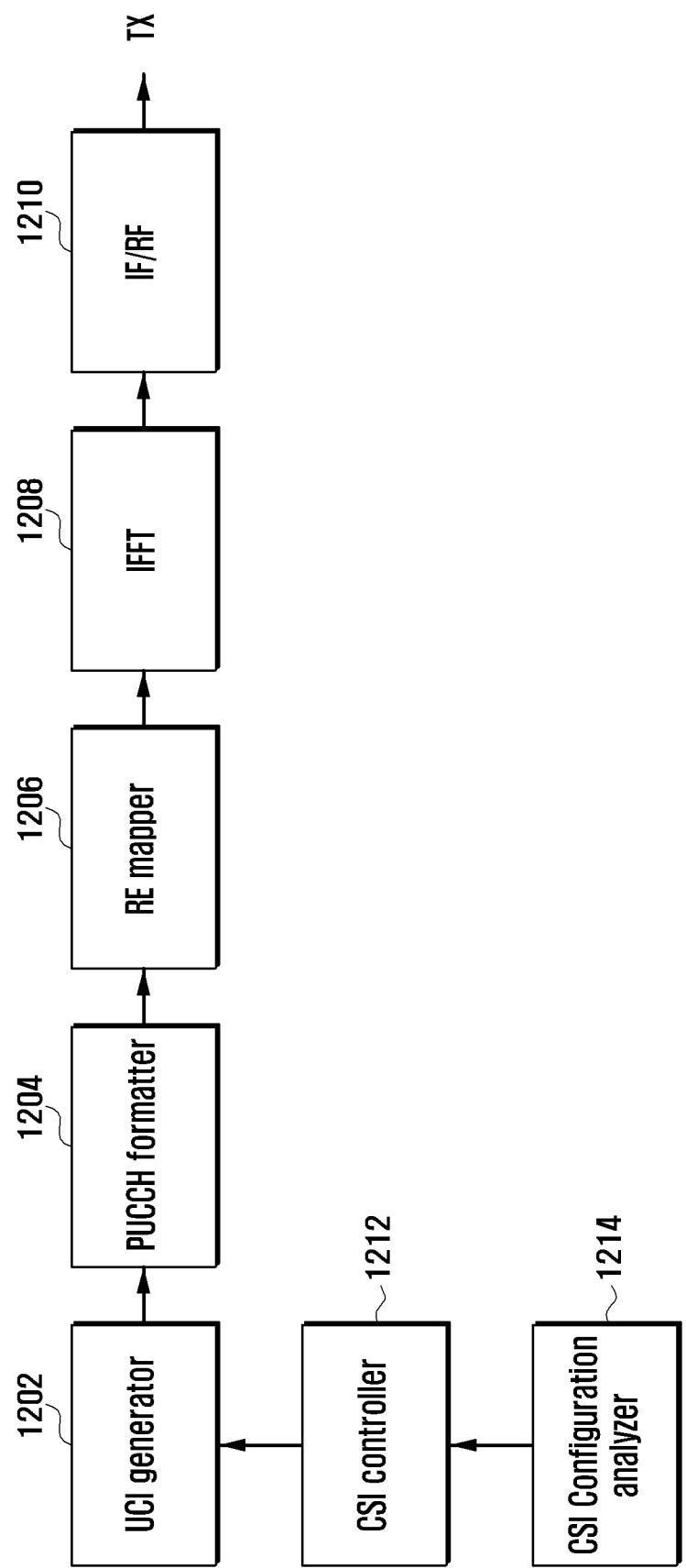
FIG. 12 is a block diagram illustrating a UE for transmitting CSI on a Physical Uplink Control Channel (PUCCH), according to an embodiment of the present invention.

FIG. 12 is a block diagram illustrating a UE for transmitting CSI on a Physical Uplink Control Channel (PUCCH), according to an embodiment of the present invention.

Referring to FIG. 12, the UE includes an Uplink Control Information (UCI) generator 1202, a PUCCH formatter 1204, a Resource Element (RE) mapper 1206, an Inverse Fast Fourier Transform (IFFT) processor 1208, an Intermediate Frequency/Radio Frequency (IF/RF) processor 1210, a CSI controller 1212, and a CSI configuration information analyzer 1214.

The UCI generator 1202 generates uplink control information for uplink transmission. Here, the UCI includes the CSI indicating a channel state. The PUCCH formatter 1204 performs channel coding and modulation to match the PUSCH transmission format. The RE mapper 1206 maps signals to be transmitted to REs. The IFFT processor 1208 performs inverse Fourier Transformation on the signal output by the RE mapper 1206. The IF/RF processor 1210 establishes a radio link with the eNB to transmit and receive radio signals. The CSI configuration information analyzer 1214 analyzes the CSI configuration information transmitted by the eNB to acquire the information on the CSI transmission timings of the C-ports and the D-ports. The CSI controller 1212 measures the CSIs of the C-ports and the D-ports and controls the UCI generator 1202 to transmit the CSIs at corresponding transmission timings.

The CSI controller 1212 includes an RSRP processor and a CSI processor. The RSRP processor controls the measuring of an RSRP of at least one of the D-ports and transmits the measured RSRP to the eNB. If the eNB determines a candidate D-port set including at least one of the D-ports based on the RSRPs measured by the UE, the CSI processor controls the measuring of the CSIs corresponding to the candidate D-ports and feeds backs the measurement result to the eNB. Here, the CSI processer repeatedly transmits the CSIs at the transmission period.

When the candidate D-port set includes at least two D-ports, the CSI processor can transmit the CSIs of the D-ports at each transmission timing in the transmission period. When the candidate D-port set includes at least two D-ports, the CSI processor can transmit the CSIs of the D-ports at the same transmission timings in the transmission period. Here, the CSI processor can select two of the C-ports and the D-ports according to their priorities for transmitting the CSIs of the selected ports. The CSI processor also can select at least one of the D-ports according to their priorities and transmits the CSIs of the C-port and the selected D-port.

Figure 13:
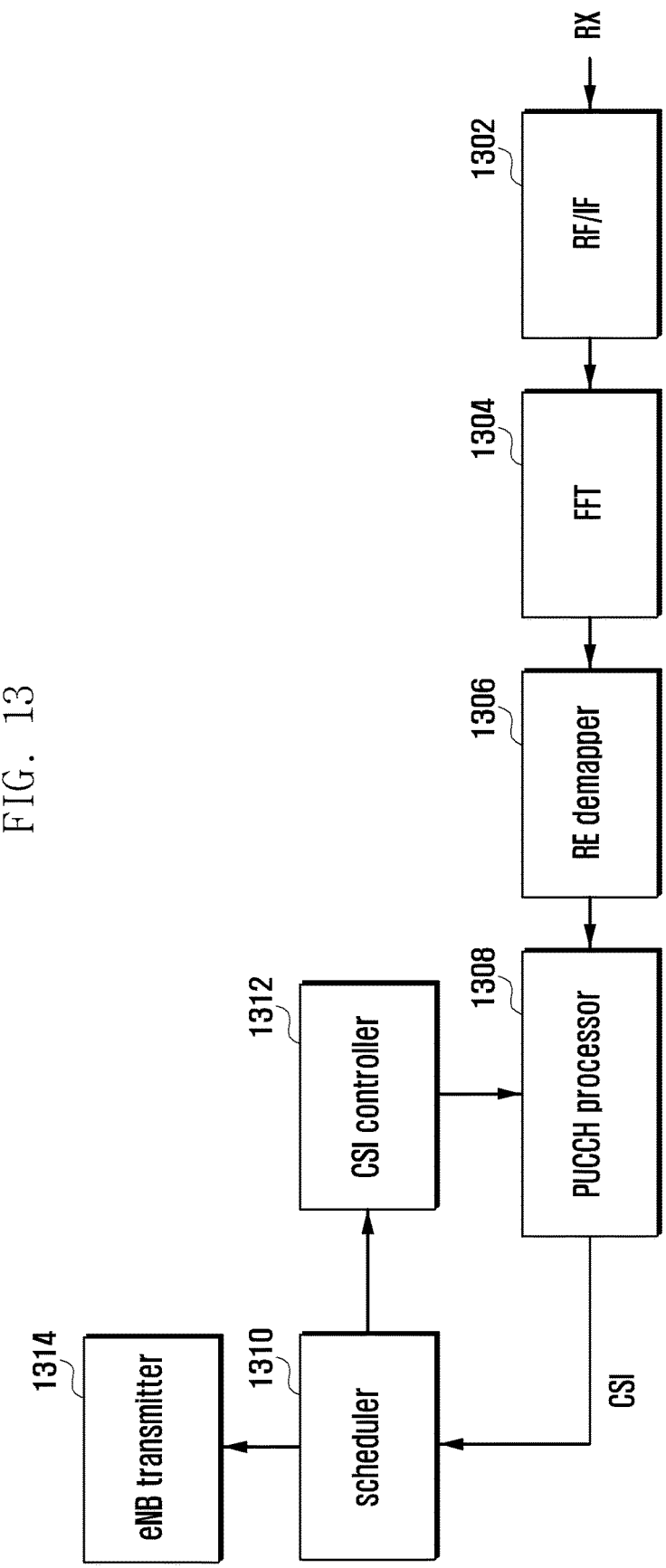
FIG. 13 is a block diagram illustrating an eNB for receiving CSI on a PUCCH, according to an embodiment of the present invention.

FIG. 13 is a block diagram illustrating an eNB for receiving CSI on a PUCCH according to an embodiment of the present invention.

Referring to FIG. 13, the eNB includes an RF/IF processor 1302, an FFT processor 1304 for performing FFT processing, an RE demapper 1306, a PUCCH processor 1308, an eNB scheduler 1310, a CSI controller 1312, and an eNB transmitter 1314.

The RF/IF processor 1302 establishes a radio link with the UE and processes RF/IF signals received and to be transmitted. The FFT processor 1304 performs Fast Fourier Transform on the received signal. The PUCCH processor 1308 includes a decoder and a demodulator for processing the signals according to a UCI type carried in the PUCCH transmitted by the UE. The eNB scheduler 1310 schedules the UE based on the CSI provided by the PUCCH processor 1308 and determines the transmission format to control the eNB transmitter 1314 based on a determination result. The CSI controller 1312 controls the PUCCH processor 1308 to process the signals for UCI to be received, based on the UE-specific CSI configuration information provided by the eNB scheduler 1310.

The CSI controller 1312 requests the UE to report RSRPs corresponding to the D-ports. If RSRPs corresponding to the D-ports are received, the CSI controller 1312 determines the candidate D-port set including at least one D-port based on the RSRPs. The CSI controller 1312 also requests the UE to report the CSIs of the candidate D-ports. If CSIs corresponding to the D-ports are received from the UE, the CSI controller 1312 selects one of the D-ports and communicates with the UE using the selected D-port.

Here, the CSI controller 1312 can transmit the CSI configuration information, which is referenced by the UE to transmit CSIs corresponding to the C-ports and D-ports periodically. The CSI configuration information can include at least one of a CSI transmission period for transmitting CSI repeatedly, CSI transmission timings for C-port and D-port CSI transmissions, offsets for determining the transmission timings in the transmission period, and an M value indicating the number of antennas selected for CSI transmission at the same timing.

In a CSI feedback method according to another embodiment of the present invention, the eNB can request the UE for CSI feedback through explicit signaling. That is, the eNB can instruct the UE to transmit CSI feedback according to its own decision, regardless of the CSI transmission period configured for the UE. This is referred to as non-periodic CSI feedback.

In order to request the CSI feedback, the eNB transmits a signal including at least one of a CSI feedback request command and CSI resource allocation information to the UE through a Physical Downlink Control Channel (PDCCH).

The CSI feedback request command is an indicator for a CSI feedback request to the UE. When the CSI feedback request command is enabled in the control information, the UE transmits CSI feedback. Here, the eNB can explicitly notify the UE of the C-port and/or D-port for which CSI is requested. That is, the CSI feedback request command information of the control information can be discriminated among C-port CSI request, D-port CSI request, C-port CSI and D-port CSI request, Best-M CSI request, specific CSI request, or all CSIs request.

Here, the C-port CSI request requests the UE to transmit C-port CSI feedback. A D-port CSI request requests the UE to transmit D-port CSI feedback. If this command is received, the UE feeds back the best CSI of the D-port selected in the candidate D-port set to the eNB.

The C-port CSI and D-port CSI request requests the UE to transmit C-port CSI and D-port CSI feedback. If this command is received, the UE feeds back the C-port CSI and the D-port CSI of the D-port selected in the candidate D-port set.

The M value can be signaled by the eNB or predetermined.

The specific CSI request requests the CSI feedback with specific port indices that are designated for the C-port CSI and D-port CSI.

The all CSI request requests both the C-port and D-port CSIs.

The CSI resource allocation information includes information on the resources allocated on the physical channel for the UE to transmit CSI feedback.

The UE transmits the CSI to the eNB through a Physical Uplink Shared Channel (PUSCH) in response to the CSI feedback request command carried in PDCCH. Although PUSCH is used for data transmission in general, it also can be used to transmit non-periodic CSI and/or a large amount of control information.

Figure 14:
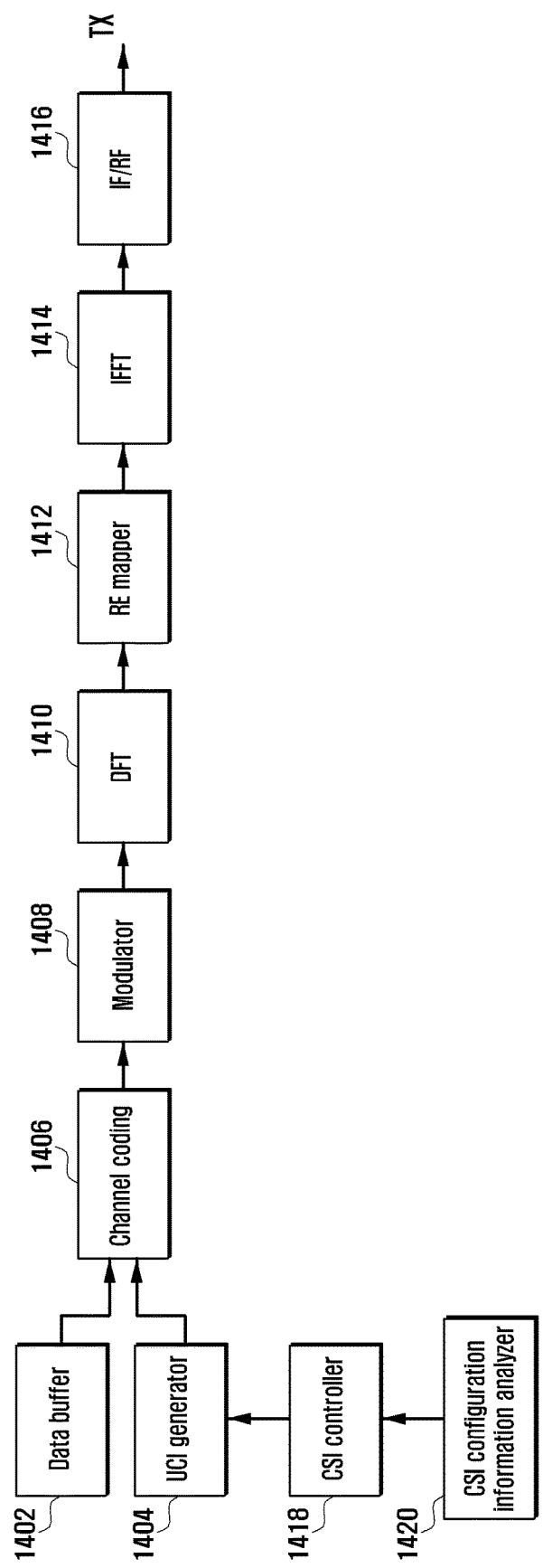
FIG. 14 is a block diagram illustrating a UE for transmitting CSI on a Physical Uplink Shared Channel (PUSCH), according to an embodiment of the present invention.

FIG. 14 is a block diagram illustrating a UE for transmitting CSI on a PUSCH, according to an embodiment of the present invention.

Referring to FIG. 14, the UE includes a data buffer 1402, a UCI generator 1404, a channel coder 1406, a modulator 1408, a DFT processor 1410, an RE mapper 1412, an IFFT processor 1414, an IF/RF processor 1416, a CSI controller 1418, and a CSI configuration information analyzer 1420.

The data buffer 1402 buffers the data to be transmitted in the uplink. The UCI generator 1404 generates uplink control information. The UCI includes CSI information indicating the channel state. The channel coder 1406 inserts error correction capability to the data and UCI. The modulator 1408 performs modulation to generate modulation symbols. The DFT processor 1410 performs DFT processing. The RE mapper 1412 maps the DFT output to REs. The IFFT processor 1414 performs inverse Fourier transform on the signal output by the RE mapper 1412. The IF/RF processor 1416 establishes a radio link with the eNB to transmit and receive radio signals. The UCI and data are transmitted to the eNB on PUSCH. The CSI configuration information analyzer 1420 analyzes the CSI configuration information transmitted by the eNB to acquire information on C-port and D-port transmission timings. The CSI controller 1418 measures the C-port CSI and D-port CSIs and controls the UCI generator 1404 to transmit the corresponding CSIs at the preconfigured transmission timings.

The CSI controller 1418 includes an RSRP processor and a CSI processor. The RSRP processor controls measuring an RSRP of at least one of the D-ports and transmits the measured RSRP to the eNB. If the eNB determines a candidate D-port set including at least one of the D-ports based on the RSRPs measured by the UE, the CSI processor controls measuring of the CSIs corresponding to the candidate D-ports and feeds backs a measurement result to the eNB. Here, the CSI processer repeatedly transmits the CSIs at the transmission period.

When the candidate D-port set includes at least two D-ports, the CSI processor can transmit the CSIs of the D-ports at each transmission timing in the transmission period. When the candidate D-port set includes at least two D-ports, the CSI processor can transmit the CSIs of the D-ports at the same transmission timings in the transmission period. Here, the CSI processor can select two of the C-ports and D-ports according to their priorities to transmit the CSIs of the selected ports. The CSI processor also can select at least one of the D-ports according to their priorities and transmit the CSIs of the C-port and the selected D-port.

Figure 15:
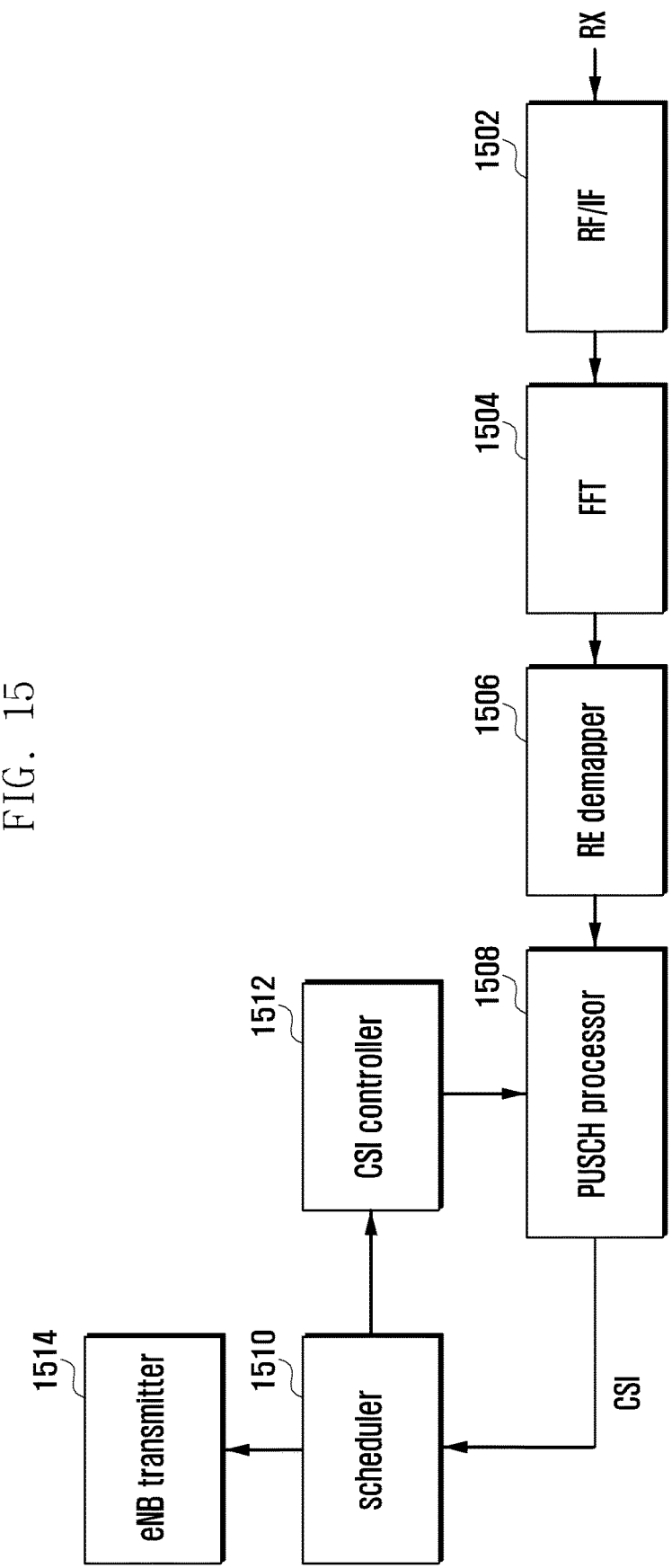
FIG. 15 is a block diagram illustrating an eNB for receiving CSI on a PUSCH, according to an embodiment of the present invention.

FIG. 15 is a block diagram illustrating an eNB for receiving CSI on a PUSCH, according to an embodiment of the present invention.

Referring to FIG. 15, the eNB includes an RF/IF processor 1502, an FFT processor 1504, an RE demapper 1506, a PUSCH processor 1508, an eNB scheduler 1510, a CSI controller 1512, and an eNB transmitter 1514.

The RF/IF processor 1502 establishes a radio link with the UE and processes RF/IF signals received and to be transmitted. The FFT processor 1504 performs Fast Fourier Transform on the received signal. The PUCCH processor 1508 includes a decoder and a demodulator for processing the signals according to a UCI type carried in the PUSCH transmitted by the UE. The eNB scheduler 1510 schedules the UE based on the CSI provided by the PUSCH processor 1508 and determines the transmission format to control the eNB transmitter 1514 based on a determination result. The CSI controller 1512 controls the PUSCH processor 1508 to process the signals for UCI to be received based on the UE-specific CSI configuration information provided by the eNB scheduler 1510.

The CSI controller 1512 requests the UE to report RSRPs corresponding to the D-ports. If RSRPs corresponding to the D-ports are received, the CSI controller 1512 determines a candidate D-port set including at least one D-port based on the RSRPs. The CSI controller 1512 also requests the UE to report the CSIs of the candidate D-ports. If CSIs corresponding to the D-ports are received from the UE, the CSI controller 1512 selects one of the D-ports and communicates with the UE using the selected D-port.

The channel status information feedback methods and apparatuses of the above-described embodiments of the present invention are capable of efficiently transmitting and receiving channel status information on the DAS-based distributed antennas and the CAS-based central antenna, thereby improving management efficiency and throughput of a wireless communication system implemented with the DAS.

Although certain embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

What is claimed is:

1. A method by a terminal to transmit channel state information in a mobile communication system, the method comprising:
   receiving channel measurement information from a base station, the channel measurement information comprising a plurality of antenna ports to be measured for a serving cell;
   measuring signals related to the plurality of antenna ports based on the channel measurement information;
   transmitting reference signal received power (RSRP) information for the plurality of antenna ports based on the measured signals;
   receiving, from the base station, in response to transmission of the RSRP information, channel state information (CSI) report instruction information for a candidate of a distributed antenna port set, wherein the candidate of the distributed antenna port set includes at least one antenna port;
   measuring a channel state of the at least one antenna port included in the candidate of the distributed antenna port set; and
   transmitting the measured channel state to the base station,
   wherein the candidate of the distributed antenna port set among the plurality of antenna ports is determined based on the RSRP information by the base station.

2. The method of claim 1, wherein the CSI report instruction information is received via a physical downlink control channel.

3. An apparatus for transmitting channel state information in a mobile communication system, the apparatus comprising:
   a radio frequency (RF) processor configured to establish a radio link with a base station; and
   a channel state information (CSI) controller configured to:
   receive, from the base station, channel measurement information, the channel measurement information comprising a plurality of antenna ports to be measured for a serving cell,
   measure signals related to the plurality of antenna ports based on the channel measurement information,
   transmit reference signal received power (RSRP) information for the plurality of antenna ports based on the measured signals,
   receive, from the base station, in response to transmission of the RSRP information, CSI report instruction information on a candidate of a distributed antenna port set wherein the candidate of the distributed antenna port set includes at least one antenna port,
   measure a channel state of the at least one antenna port included in the candidate of the distributed antenna port set, and
   transmit the measured channel state to the base station,
   wherein the candidate of the distributed antenna port set among the plurality of antenna ports is determined based on the RSRP information by the base station.

4. The apparatus of claim 3, wherein the CSI report instruction information is received via a physical downlink control channel.

5. A method by a base station to receive channel state information in a mobile communication system, the method comprising:

transmitting channel measurement information to a terminal, the channel measurement information comprising a plurality of antenna ports to be measured for a serving cell by the terminal;

receiving, from the terminal, in response to transmission of the channel measurement information, reference signal received power (RSRP) information for the plurality of antenna ports;

determining a candidate of a distributed antenna port set among the plurality of antenna ports based on the received RSRP information, wherein the candidate of the distributed antenna port set includes at least one antenna port;

transmitting channel state information (CSI) report instruction information including information for the candidate of a distributed antenna port set;

receiving, in response to transmission of the CSI report instruction information, a measured channel state of the at least one antenna port included in the candidate of the distributed antenna port set from the terminal.

6. The method of claim 5, wherein the CSI report instruction information is transmitted via a physical downlink control channel.

7. An apparatus for receiving channel state information in a mobile communication system, the apparatus comprising:
a radio frequency processor configured to establish a radio link for communication with a terminal; and
a channel state information (CSI) controller configured to
transmit, to the terminal, channel measurement information, the channel measurement information comprising a plurality of antenna ports to be measured for a serving cell by the terminal,
receive, from the terminal, in response to transmission of the channel measurement information, reference signal received power (RSRP) information for the plurality of antenna ports,
determine a candidate of a distributed antenna port set among the plurality of antenna ports based on the received RSRP information, wherein the candidate of the distributed antenna port set includes at least one antenna port,
transmit, to the terminal, CSI report instruction information including information for the candidate of the distributed antenna port set, and
receive, in response to transmission of the CSI report instruction information, a measured channel state of the at least one antenna port included in the candidate of the distributed antenna port set from the terminal.

8. The apparatus of claim 7, wherein the CSI report instruction information is transmitted via a physical downlink control channel.

9. The method of claim 1, further comprising:
receiving data from the base station by an antenna port selected from the candidate of the distributed antenna port set based on the measured channel state.

10. The method of claim 1, wherein the CSI report instruction message further comprises information for triggering a CSI report by the terminal.

11. The apparatus of claim 3, wherein the CSI controller is further configured to receive data from the base station by an antenna port selected from the candidate of the distributed antenna port set based on the measured channel state.

12. The apparatus of claim 3, wherein the CSI report instruction message further comprises information for triggering a CSI report by the terminal.

13. The method of claim 5, further comprising:
transmitting data to the terminal by an antenna port selected from the candidate of the distributed antenna port set based on the measured channel state.

14. The method of claim 5, wherein the CSI report instruction message further comprises information for triggering a CSI report by the terminal.

15. The apparatus of claim 7, wherein the CSI controller is further configured to transmit data to the terminal by an antenna port selected from the candidate of the distributed antenna port set based on the measured channel state.

16. The apparatus of claim 7, wherein the CSI report instruction message further comprises information for triggering a CSI report by the terminal.

* * * * *